United States Patent
Hogg

(10) Patent No.: US 7,842,145 B2
(45) Date of Patent: Nov. 30, 2010

(54) METHOD FOR LAYING COMPOSITE TAPE

(75) Inventor: Merrill W. Hogg, Maple Valley, WA (US)

(73) Assignee: The Boeing Company, Chicago, IL (US)

( * ) Notice: Subject to any disclaimer, the term of this patent is extended or adjusted under 35 U.S.C. 154(b) by 1234 days.

(21) Appl. No.: 11/221,058

(22) Filed: Sep. 7, 2005

(65) Prior Publication Data

US 2006/0073309 A1 Apr. 6, 2006

Related U.S. Application Data

(60) Provisional application No. 60/615,895, filed on Oct. 5, 2004.

(51) Int. Cl.
*B32B 41/00* (2006.01)
(52) U.S. Cl. .......... 156/64; 156/160; 156/167; 156/168; 156/169; 156/235
(58) Field of Classification Search .......... 156/64, 156/160, 167, 168, 169, 235
See application file for complete search history.

(56) References Cited

U.S. PATENT DOCUMENTS

| | | |
|---|---|---|
| 3,137,750 A | 6/1964 | Gringras |
| 3,962,393 A | 6/1976 | Blad |
| 3,996,089 A | 12/1976 | More et al. |
| 4,044,188 A | 8/1977 | Segal |
| 4,060,413 A | 11/1977 | Mazzei et al. |
| 4,065,340 A | 12/1977 | Dickerson |
| 4,133,627 A | 1/1979 | Kontz |
| 4,351,688 A | 9/1982 | Weiss et al. |
| 4,396,566 A | 8/1983 | Brinkmann et al. |
| 4,401,495 A | 8/1983 | McKinney |
| 4,462,946 A | 7/1984 | Goldsworthy |
| 4,519,285 A | 5/1985 | Dontscheff |
| 4,600,617 A | 7/1986 | Cole |
| 4,692,291 A | 9/1987 | Angell, Jr. |
| 4,696,707 A * | 9/1987 | Lewis et al. ............. 156/64 |
| 4,741,943 A | 5/1988 | Hunt |
| 4,780,432 A | 10/1988 | Minford et al. |
| 4,789,416 A | 12/1988 | Ford |
| 4,816,313 A | 3/1989 | Hosokawa et al. |
| 4,867,834 A | 9/1989 | Alenskis et al. |

(Continued)

FOREIGN PATENT DOCUMENTS

EP 0 491 355 A1 6/1992

(Continued)

OTHER PUBLICATIONS

Klein, Allen J., "Automated Tape Laying", Advanced Composites, Jan./Feb. 1989, pp. 44-52.*

(Continued)

*Primary Examiner*—George R Koch, III
(74) *Attorney, Agent, or Firm*—Alston & Bird LLP

(57) ABSTRACT

A composite member and an associated method for forming the composite member are provided. The composite member is formed of a plurality of elongate tapes. Each tape is disposed a path defined by a plurality of natural path segments, each of which defines a non-natural offset angle relative to the adjacent segments.

13 Claims, 5 Drawing Sheets

U.S. PATENT DOCUMENTS

| | | |
|---|---|---|
| 4,909,880 A | 3/1990 | Kittelson et al. |
| 4,933,131 A | 6/1990 | Okey et al. |
| 4,946,538 A | 8/1990 | Bendarzewski et al. |
| 4,952,366 A | 8/1990 | Gelin |
| 4,957,677 A | 9/1990 | Katoh et al. |
| 4,978,360 A | 12/1990 | Devanathan |
| 4,997,510 A | 3/1991 | Shinno et al. |
| 5,038,291 A | 8/1991 | Wang et al. |
| 5,041,179 A | 8/1991 | Shinno et al. |
| 5,041,260 A | 8/1991 | Johnson et al. |
| 5,049,342 A | 9/1991 | Scanlon et al. |
| 5,089,189 A | 2/1992 | Staneluis et al. |
| 5,106,568 A | 4/1992 | Honka |
| 5,117,348 A | 5/1992 | Romero et al. |
| 5,120,976 A | 6/1992 | Clayton et al. |
| 5,121,329 A | 6/1992 | Crump |
| 5,145,615 A | 9/1992 | Kim et al. |
| 5,177,340 A | 1/1993 | Zaffiro |
| 5,213,646 A | 5/1993 | Zsolnay et al. |
| 5,217,654 A | 6/1993 | Buckley |
| 5,229,052 A | 7/1993 | Billiu |
| 5,248,242 A | 9/1993 | Lallo et al. |
| 5,266,139 A | 11/1993 | Yokota et al. |
| 5,310,582 A | 5/1994 | Vyakarnam et al. |
| 5,320,511 A | 6/1994 | Woerner |
| 5,340,433 A | 8/1994 | Crump |
| 5,340,625 A | 8/1994 | Weitsman et al. |
| 5,355,567 A | 10/1994 | Holliday |
| 5,364,258 A | 11/1994 | Buckley et al. |
| 5,368,793 A | 11/1994 | Lau |
| 5,374,388 A | 12/1994 | Frailey |
| 5,396,415 A | 3/1995 | Konar et al. |
| 5,401,154 A | 3/1995 | Sargent |
| 5,403,537 A | 4/1995 | Seal et al. |
| 5,447,586 A | 9/1995 | Tam |
| 5,456,957 A | 10/1995 | Jackson et al. |
| 5,472,553 A | 12/1995 | Roberts |
| 5,482,667 A | 1/1996 | Dunton et al. |
| 5,503,466 A | 4/1996 | Lew |
| 5,516,271 A | 5/1996 | Swenor et al. |
| 5,540,877 A | 7/1996 | Repetto et al. |
| 5,560,942 A | 10/1996 | Curry |
| 5,595,692 A | 1/1997 | Folsom et al. |
| 5,705,788 A | 1/1998 | Beyer et al. |
| 5,707,576 A | 1/1998 | Asher |
| 5,721,047 A | 2/1998 | Thicthener et al. |
| 5,795,094 A | 8/1998 | McKague, Jr. et al. |
| 5,886,313 A | 3/1999 | Krause et al. |
| 5,954,898 A | 9/1999 | McKague et al. |
| 6,272,664 B1 | 8/2001 | Chang et al. |
| 6,406,580 B1 | 6/2002 | Campbell, Jr. |
| 6,451,152 B1 | 9/2002 | Holmes et al. |
| 6,466,829 B1 | 10/2002 | Sickler |
| 6,476,716 B1 | 11/2002 | Ledlow |
| 6,495,091 B1 | 12/2002 | Manson et al. |

FOREIGN PATENT DOCUMENTS

| | | |
|---|---|---|
| EP | 0 534 092 A1 | 3/1993 |
| GB | 2 209 159 A | 5/1989 |

OTHER PUBLICATIONS

Search Report for PCT/2005/035445 dated Feb. 9, 2006.

U.S. Appl. No. 11/088,288, filed Mar. 24, 2005, Hogg.

P. F. Lichtenwainer, Neural Network-Based Control for the Fiber Placement Composite Manufacturing Process, Journal of Materials Engineering and Performance, Oct. 1993, pp. 687-691, vol. 2(5).

Catia V4 Geodesic (GEO); 2 pages http://www-306.ibm.com/software/applications/plm/catiav4/prods/geo/, Dec. 19, 2005.

Evans, "Fiber Placement," *Manufacturing Processes*, pp. 477-479.

Grimshaw et al., "Advanced Technology Tape Laying for Affordable Manufacturing of Large Composite Structures," 11 pages.

Grimshaw, "Automated Tape Laying," *Manufacturing Processes*, pp. 480-485.

\* cited by examiner

METHOD FOR LAYING COMPOSITE TAPE

This application claims the benefit of U.S. Provisional Application No. 60/615,895, filed Oct. 5, 2004, which is incorporated herein in its entirety.

BACKGROUND OF THE INVENTION

1) Field of the Invention

The present invention relates to the manufacture of composite structures and, more specifically, to an apparatus and associated method for laying or disposing elongate tapes in a contoured configuration to form the composite structures.

2) Description of Related Art

Composite members are typically formed of a reinforcement material that is disposed in a matrix material. For example, the reinforcement material can be a fibrous material such as graphite, and the matrix material can be a resinous polymer material. According to one conventional manufacturing method, the composite material is disposed in the desired shape of the composite member by laying a plurality of elongate composite tapes to progressively build the layers of the member. An automated operation for forming the composite member can begin by using a contoured tape laying machine (CTLM) to dispose a first layer of tapes onto a mandrel that defines the shape of the composite member. The CTLM includes a roll or other supply of the tape, which is dispensed onto the mandrel with a tape placement head that guides the tapes onto the mandrel in the desired configuration. That is, the tape placement head provides relative movement between the mandrel and the head so that the head moves over the surface of the mandrel. The head usually makes repeated passes over the mandrel in a defined pattern until the mandrel is entirely covered, and additional layers of the tape are built up by continued passes of the head over the surface. A compaction roller presses the tape against the mandrel or the previously disposed layers of tape to facilitate adhesion of the multiple layers of the tape.

This conventional CTLM can accurately place the tapes, and the automated process can increase the speed at which the composite members can be formed. In addition, the CTLM is typically able to lay the tapes in a variety of configurations corresponding to the surface of a select mandrel to thereby form the composite member to the desired shape. In one conventional method for manufacturing a complex contoured surface, a first tape is disposed across the mandrel along a natural path, i.e., a course along which the tape can be disposed substantially flat against the mandrel with minimal stressing or wrinkling of the tape. For a contoured mandrel, the natural path is typically curved. After the first tape is disposed along a natural path, subsequent tapes are disposed along natural paths that extend across the mandrel in a similar direction as the first tape, i.e., generally parallel to the first tape. However, due to the complex contour of the mandrel, the natural paths of the adjacent tapes are not parallel along their entire lengths. Typically, the tapes are disposed about as close as possible while avoiding any overlapping of adjacent tapes (i.e., "laps"). Thus, the edges of adjacent tapes that are disposed along natural paths define spaces or "gaps" therebetween, and the size of the gaps can vary along the lengths of the tapes. In some cases, the CTLM may be unsuitable for forming the member.

Therefore, there exists a need for an apparatus and method for disposing tapes to define complex configurations while reducing or minimizing the laps and/or gaps defined by adjacent tapes and for doing so without substantially wrinkling the disposed tapes.

SUMMARY OF THE INVENTION

The present invention provides a method of forming a composite member and an associated composite member and apparatus. The method can be used to dispose composite tapes to form a composite member having a complex configuration. The method can reduce or minimize the occurrence of laps, gaps, wrinkling, and/or other undesired non-uniformities in the tapes.

According to one embodiment, the present invention provides a method in which a contour surface corresponding in shape to a desired contour of the composite member is provided for supporting a plurality of elongate tapes in a substantially parallel configuration. Each tape, which includes a plurality of reinforcement members disposed in a matrix material, is disposed along a path defined by a plurality of natural path segments. Each segment defines a non-natural angle relative to adjacent segments of the path, and each tape defines a plurality of consecutive portions corresponding to the natural path segments, such that a transverse edge of each elongate tape is disposed within a predetermined offset distance interval from an adjacent one of the tapes. Typically, the tapes are disposed on the surface substantially without wrinkling of the tapes.

A configuration of each path can be determined by determining the contour of the surface, determining a first path across at least a portion of the surface, and calculating a configuration of each natural path segment of a second path adjacent the first path, a first end of the each natural path segment defining an offset angle relative to an adjacent segment such that a second end of each natural path segment defines a predetermined offset distance from the first path, the offset distance being within the predetermined offset distance interval. For example, the natural path segments can be calculated with the offset angle of each natural path segment being less than a predetermined maximum offset angle so that the elongate tapes are configured to be disposed without wrinkling. Further, the natural path segments can be calculated with the offset distance interval of the second end of each natural path segment being approximately equal to a target distance that is less than the maximum of the predetermined offset distance interval.

More particularly, the configuration of a first one of the natural path segments of the second path can be calculated at a point partially between opposite ends of the second path, and the configuration of the successive natural path segments of the second path can be calculated in opposite directions from the first one of the natural path segments, with the second end of each successive path segment defining the first end of a successive one of the path segments. Prior to calculating the configuration of the first one of the natural path segments, a configuration of a natural path adjacent the first path can be calculated, and a portion of the natural path adjacent the first path defining a minimum transverse distance therebetween can be determined. Thus, the configuration of the first one of the natural path segments can include calculating the configuration of the first one of the natural path segments at a point corresponding in position to the portion of the natural path defining the minimum transverse distance.

The elongate tapes can be disposed from a supply roll of an automated tape laying device and pressed against the contour surface with a compaction device. Each tape can be disposed in a plurality of portions, each portion being at least about a length of the tape supplied and supported between the supply roll and the compaction device of the automated tape laying device.

The present invention also provides, according to another embodiment, a composite member that includes a plurality of elongate tapes disposed in a generally parallel configuration to define a contour surface. Each of the tapes, which include a plurality of reinforcement members disposed in a matrix material, is disposed along a path defined by a plurality of natural path segments. Each segment defines a non-natural offset angle relative to adjacent segments of the path, and each tape defines a plurality of consecutive portions corresponding to the natural path segments so that a transverse edge of each elongate tape is disposed within a predetermined offset distance interval from an adjacent one of the tapes. The elongate tapes can be disposed without wrinkling. For example, the adjacent portions of each tape can define non-natural offset angles that are no more than about 4° or no more than about 0.5°. The tapes can define various numbers of portions disposed along natural path segments, typically depending on the length of the tapes. For example, each segment (and, hence, each consecutive portion of the tapes) can define a length that is between about 3 inches and 6 feet, such as between about 6 inches and 3 feet, with the adjacent portions of each tape defining the non-natural offset angles therebetween.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

DETAILED DESCRIPTION OF THE INVENTION

The present invention now will be described more fully hereinafter with reference to the accompanying drawings, in which some, but not all embodiments of the invention are shown. Indeed, this invention may be embodied in many different forms and should not be construed as limited to the embodiments set forth herein; rather, these embodiments are provided so that this disclosure will satisfy applicable legal requirements. Like numbers refer to like elements throughout.

Figure 1:
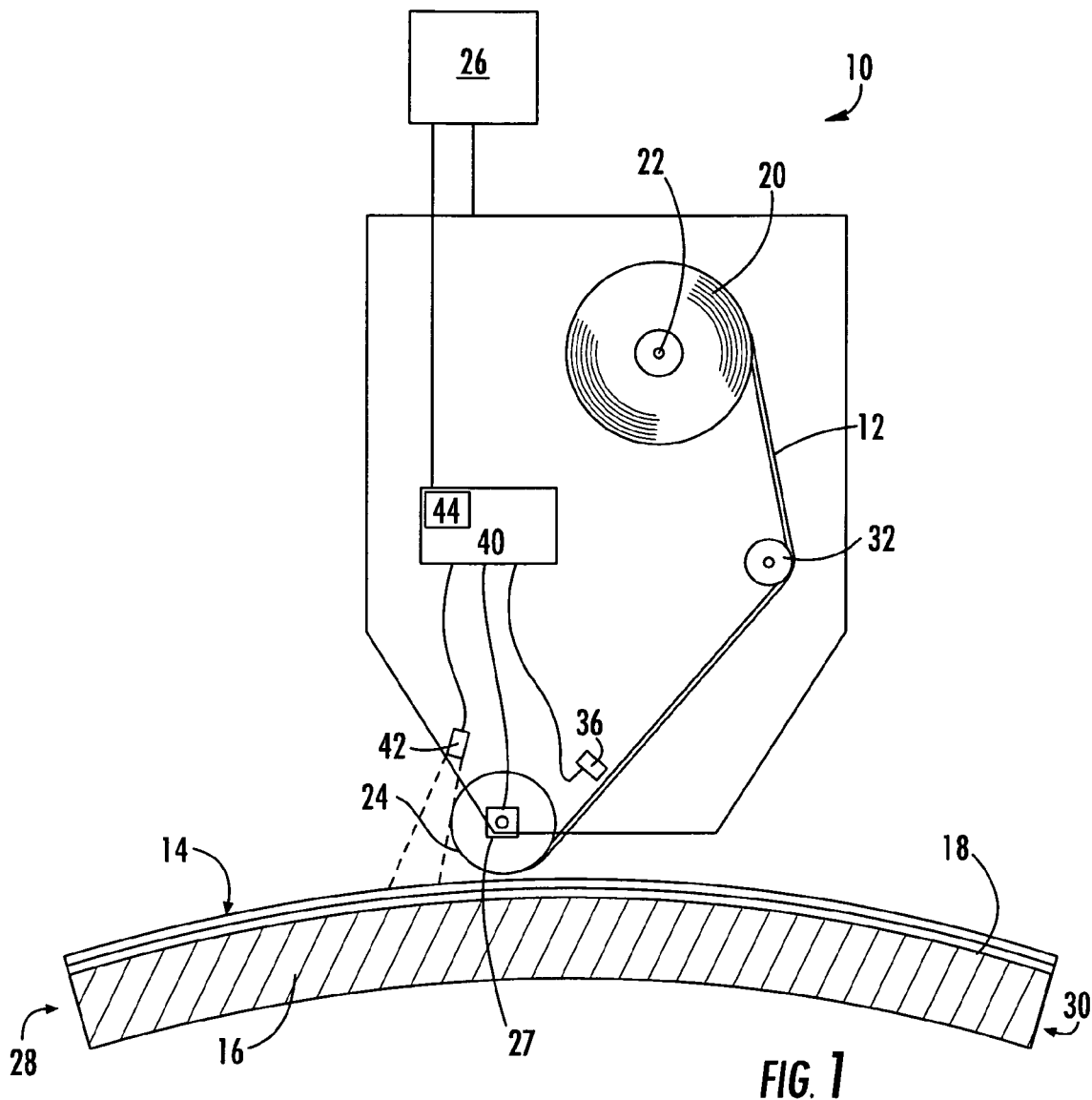
FIG. 1 is an elevation view schematically illustrating an apparatus for disposing an elongate tape during formation of a composite member according to one embodiment of the present invention.

Referring now to the drawings and, in particular, to FIG. 1, there is schematically illustrated an apparatus 10 for disposing an elongate tape 12 during formation of a composite member 14 according to one embodiment of the present invention. The apparatus 10 can be used to form composite members 14 of a variety of materials and having various configurations. In particular, the apparatus 10 can be used to dispose one or more elongate tape 12 that includes a reinforcement material disposed in a matrix material. The tapes 12 can be provided in various sizes and shapes, typically being long rectangular strips having a width of 3 inches, 6 inches, or 12 inches. Typically, the reinforcement material is a plurality of fibrous members such as fibers, strands, braids, woven or nonwoven mats, and the like of materials such as fiberglass, metal, minerals, conductive or nonconductive graphite or carbon, nylon, aramids such as Kevlar®, a registered trademark of E. I. du Pont de Nemours and Company, and the like. Each tape 12 typically includes the matrix material, in which the reinforcement members are disposed. In some cases, however, the tapes 12 can be formed without the matrix material, and the matrix material can be disposed separately. In any case, the matrix material can include various materials such as thermoplastic or thermoset polymeric resins. Exemplary thermosetting resins include allyls, alkyd polyesters, bismaleimides (BMI), epoxies, phenolic resins, polyesters, polyurethanes (PUR), polyurea-formaldehyde, cyanate ester, and vinyl ester resin. Exemplary thermoplastic resins include liquid-crystal polymers (LCP); fluoroplastics, including polytetrafluoroethylene (PTFE), fluorinated ethylene propylene (FEP), perfluoroalkoxy resin (PFA), polychlorotrifluoroethylene (PCTFE), and polytetrafluoroethylene-perfluoromethylvinylether (MFA); ketone-based resins, including polyetheretherketone (PEEK™, a trademark of Victrex PLC Corporation, Thointons Cleveleys Lancashire, UK); polyamides such as nylon-6/6, 30% glass fiber; polyethersulfones (PES); polyamideimides (PAIS), polyethylenes (PE); polyester thermoplastics, including polybutylene terephthalate (PBT), polyethylene terephthalate (PET), and poly(phenylene terephthalates); polysulfones (PSU); poly (phenylene sulfides) (PPS).

Figure 2:
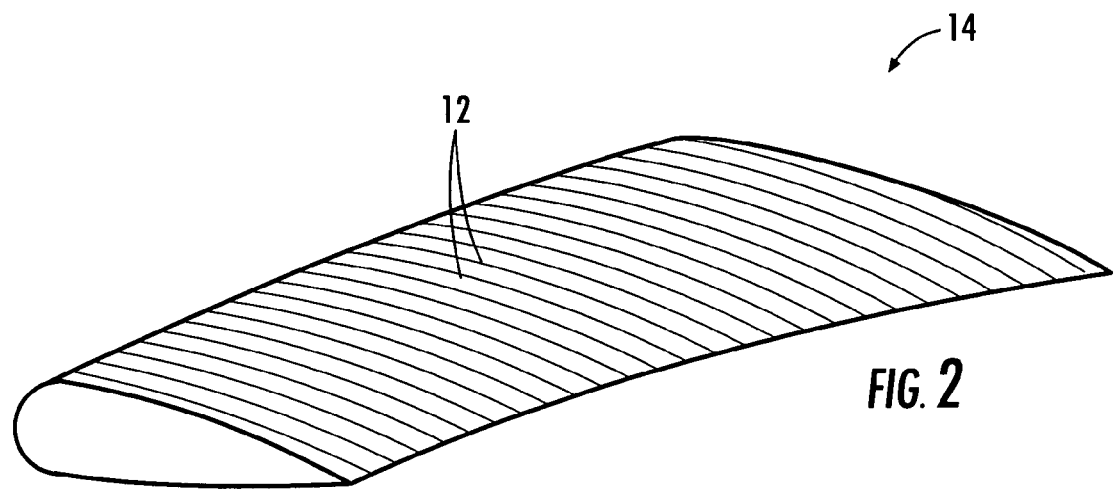
FIG. 2 is a perspective view illustrating a composite member formed according to one embodiment of the present invention.

As discussed further below, the tapes 12 can be disposed to define a desired configuration of the composite member 14. In particular, the tapes 12 can be disposed to form members of various sizes and shapes. For example, the composite member 14 illustrated in FIG. 2 is a wing for an aircraft. In other embodiments, the composite members 14 can be used as other airfoils, aircraft body panels, other members for aerospace vehicles and structures, structural members of automobiles, marine vehicles or other vehicles, and the like. In some cases, the composite member 14 can define a complex geometry, e.g., one or more contours that are curved about multiple axes, define bends, apertures, or other irregular shapes, and the like.

The apparatus 10 can generally define a tape placement head that is used to dispose the elongate tape 12 in a configuration corresponding to the desired shape of the composite member 14. For example, as illustrated in FIG. 1, the apparatus 10 can dispose the elongate tape 12 onto a mandrel 16, i.e., a tool with a contour surface 18 that is then imparted to the tape 12 and, hence, the composite member 14. It is appreciated that various types of mandrels can be used, and the mandrel 16 can define a variety of contours. In particular, the surface 18 of the mandrel 16 can define a complex contour on which it would be difficult or impossible to dispose rectangular tapes without laps or gaps occurring between the adjacent tapes. Also, while it is generally described herein that the tape 12 can be disposed "on" the mandrel 16, it is appreciated that a first layer of the tape 12 may be disposed directly on the mandrel 16 and subsequent layers may be disposed on the prior layers.

The apparatus 10 includes a supply of one or more elongate tape 12, which is dispensed and disposed onto the contour surface 18. For example, the tape 12 can be supplied in a dispenser, such as a roll 20 that is supported on a spool 22 mounted in the apparatus 10. In some cases, the dispenser can include multiple rolls or other supply devices that provide multiple tapes 12 to be simultaneously disposed on the mandrel 16. Alternatively, a single tape 12 can be disposed in one or more portions. For example, a single tape 12 can be severed into multiple portions that are disposed successively on the mandrel 16, or the single tape 12 can be disposed continuously on the mandrel 16 as a single piece without being severed. That is, the "plurality of tapes" or "multiple tapes" referred to herein can be disposed as a single piece of tape that defines a plurality of adjacent elongate portions.

In the embodiment illustrated in FIG. 1, the spool 22 supporting the roll 20 is rotatably mounted so that the tape 12 can be dispensed therefrom. The tape 12 is supplied from the roll 20 to a placement guide that controls the placement of the tape 12 on the mandrel 16. The placement guide can be a roller 24, as shown, that is rotatably mounted so that the apparatus 10 can be moved over the surface 18 of the mandrel 16 with the roller 24 in rolling contact therewith. Thus, the apparatus 10 can apply a force via the roller 24 in a direction generally towards the mandrel 16 so that the compaction roller 24 exerts pressure on the tape 12 to press it against the mandrel 16 in a compaction region. The roller 24 can also be adjustably mounted by mounts 27, which can adjust relative to the rest of the apparatus 10 so that the roller 24 can apply varying pressures against the tape 12 and mandrel 16 or otherwise control the placement of the tape 12. While a compaction roller 24 is depicted, other types of compaction devices may be utilized, such as a compaction shoe or a press.

The apparatus 10 is moved relative to the mandrel 16 by a drive assembly 26, which is schematically indicated in FIG. 1. The drive assembly 26 can include various drive devices such as pneumatic or hydraulic actuators, electrical motors or servos, and/or chain, gear, or shaft drive mechanisms. The drive assembly 26 can be configured to move the apparatus 10 or the mandrel 16 to achieve the desired relative placement of the apparatus 10 relative to the mandrel 16 for disposing the tape 12 over the surface 18 of the mandrel 16. Typically, the apparatus 10 is moved generally linearly along the surface 18 of the mandrel 16 in multiple passes, with one or more portions of the tape 12 being disposed in each pass. For example, the apparatus 10 can move from a first end 28 of the mandrel 16 to an opposite end 30 to dispose one or more tape 12, then return to the first end 28 to start another pass in the same direction to dispose additional tape 12 adjacent those tapes 12 disposed in the previous pass. Alternatively, the apparatus 10 can wrap one or more tapes 12 in continuous passes around the mandrel 16, with the position and/or direction being adjusted between each pass so that the tapes 12 are disposed in adjacent portions.

The apparatus 10 can also include various other components. For example, roller 32 can be used to guide the tape 12 through the apparatus 10. Any number of rollers 32, 34 can be provided, and in some cases, some or all of the rollers 32, 34 can be driven by a motor or other actuator to control the motion of the tape 12. In addition, the apparatus 10 typically includes a heating device 36 for heating the tape 12 and/or the mandrel 16. The heating device 36 can be a laser, a laser diode array, a hot gas torch, an electric heater, or the like. The heating device 36 typically delivers sufficient energy to permit the tape 12, once subjected to the compaction forces, to adhere to the underlying tape 12.

The heating device 36 can include multiple independent heating elements, such as multiple laser diodes that form an array. Each heating element can be coupled to a power source in a manner independent of the other laser diodes so that the operating power of each heating element can be controlled independently of the other heating elements. One such heating device is further described in U.S. Pat. No. 6,451,152 to Holmes, et al., entitled "Method for Heating and Controlling Temperature of Composite Material During Automated Placement," issued Sep. 17, 2002 and assigned to the assignee of the present application, and the entirety of which is herein incorporated by reference. Further, as described in U.S. Pat. No. 6,451,152, the individual heating elements can be arranged so that each is configured to heat a particular area or zone, which can be defined by the tape 12, before and/or after being disposed on the mandrel 16. Thus, by altering the operating power of one or more of the heating elements, the heating of a particular one of the tapes 12 or a particular area of the tapes 12 can be controlled independently of the heating of other tapes 12. Non-uniform heating of the zones may be desirable, for example, if the tapes 12 are not the same size or are not made of the same materials and thus require different amounts of energy to attain their optimum temperature for placement. Also, different amounts of heating may be desirable due to the geometry of the mandrel 16.

The heating device 36 can electrically communicate with a controller 40 configured to control the heating device 36. The controller 40 can also perform other functions, for example, functions integral to inspection, speed control, temperature and velocity sensing, defect marking, and the like. For example, the apparatus 10 can have an inspection system 42 that includes cameras, temperature sensors, pre-placement detectors, tack monitoring devices, and the like for monitoring the tape 12. Additionally, the apparatus 10 can include a marking device for marking defects or other designated portions of the composite member 14.

Each of the elongate tapes 12 can be disposed along a modified path 50 that is defined by a plurality of natural path segments. The term "natural path" refers to a geodesic curve, i.e., a curve which is locally straight with respect to the surface because its geodesic curvature is equal to zero at every point. Geodesic curvature is a special kind of curvature, which can be defined in the context of a curve lying on a surface. Given a curve lying on a surface, at each point where the curve touches the surface, a plane can be constructed, called the tangent plane, which is the best flat approximation to the set of neighboring points on the surface. If at a given point, the curve, when projected (i.e. viewed) perpendicular to the tangent plane at that point, appears straight, then the curve has zero geodesic curvature at that point. A geodesic curve (or natural path) has this property at every point along its length. Given two distinct points on a surface, the shortest path between them is a geodesic curve.

Each modified path 50 according to the present invention includes a plurality of natural path segments that define non-natural offset angles at the points where the segments join. That is, each segment of the modified paths 50 defines a natural path. However, if the modified path is projected perpendicular to the tangent plane at a point where two adjacent segments join, then the projected segments define an offset angle at that projected point which is not zero. Thus, the modified paths do not have geodesic curvature equal to zero at the points where adjacent segments join, and hence are not natural paths.

Accordingly, with the tapes 12 disposed along the modified paths 50 of the present invention, each tape 12 defines a plurality of consecutive portions, each portion corresponding to one of the natural path segments. Each segment of each path 50, and hence each portion of each tape 12, can be linear or nonlinear. For example, the natural path over a planar portion of a surface is linear; however, the natural path over the contoured mandrel 16 is nonlinear and can define curvature about one or more dimensions depending on the configuration of the surface 18.

Figure 3:
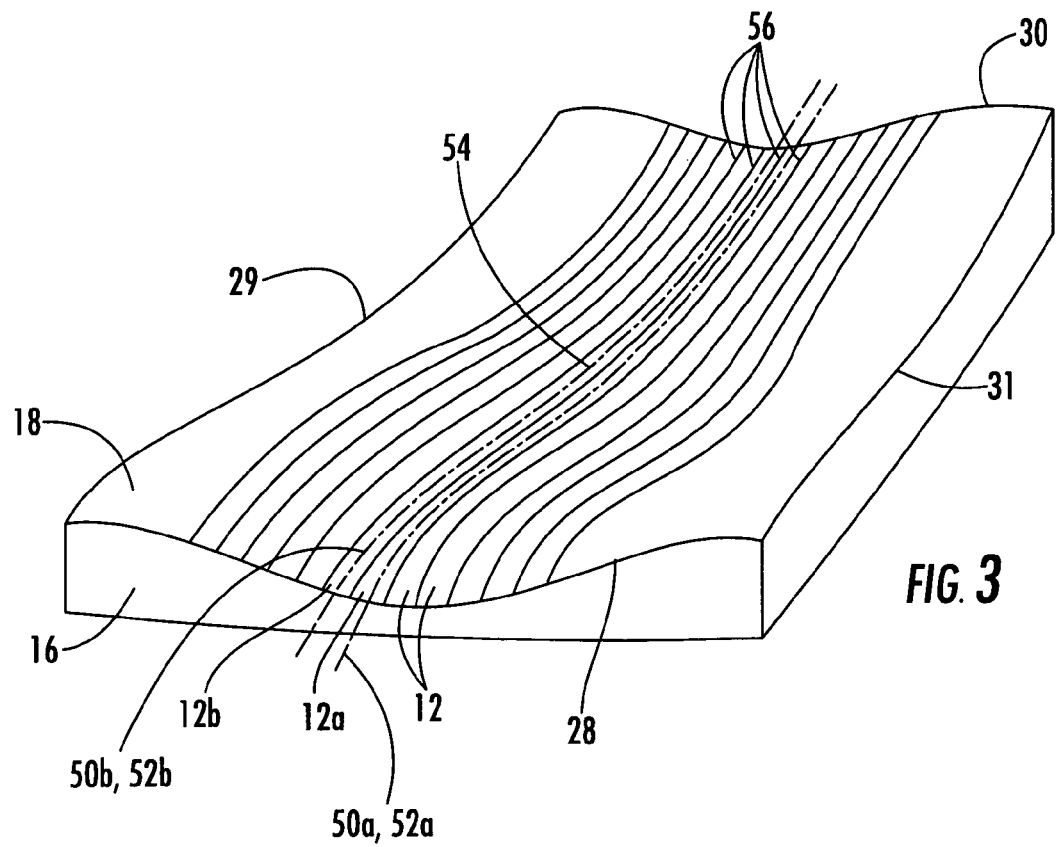
FIG. 3 is a perspective view illustrating a composite member during manufacture according to one embodiment of the present invention.
Figure 4:
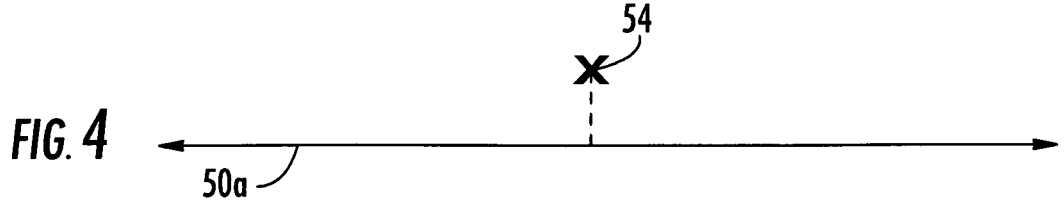
FIGS. 4-8 are plan views schematically illustrating the paths along which elongate tapes are disposed for forming a composite member according to one embodiment of the present invention.

One method of determining the path 50 of each tape 12 for forming the composite member 14 is illustrated in FIGS. 4-8. FIG. 4 illustrates a first path 50a that corresponds to a centerline 52a of a first one of the tapes 12, indicated individually by reference numeral 12a. The tape that is disposed first on the contour surface 18 for forming the composite member 14 is typically disposed along a natural path that extends between the longitudinal ends 28, 30 of the mandrel 16 at a position between transverse ends 29, 31 of the mandrel 16. For example, as shown in FIG. 3, the first tape 12a can be disposed on the mandrel 16 before any of the other tapes 12, and is disposed along a natural path. Subsequent tapes 12 are disposed generally parallel to the first tape 12a on either side of the first tape 12a. The centerline 52a of the first tape 12a is indicated in FIG. 3 for purposes of illustrative clarity. As shown in FIG. 3, the centerline of the first tape 12a defines a three-dimensional curve, i.e., a line that curves about multiple, nonparallel axes.

Referring again to FIG. 4, the path 50a of the first tape 12a is illustrated (corresponding to the tape's centerline 52a) in a straight configuration for illustrative clarity, though the actual configuration of the path 50a can be curved to correspond to the centerline 52a of the tape 12a as shown in FIG. 3. The first path 50a can be a natural path, i.e., the path 50 of the tape 12 that is to be disposed first on the contour surface 18. Alternatively, the first path 50a indicated in FIG. 4 can be a segmented path that is calculated according to the method described below. That is, the terms "first path" and "first tape" are used below for convenience to refer to a preceding tape for which the path 50a has been calculated and used for reference in calculating the configuration of a second path 54 that is subsequent and adjacent the first path 50a, and along which a second tape is to be disposed adjacent the first tape 12a. The tapes 12 can be disposed on the surface 18 in various sequential orders. Further, FIGS. 4-8 do not illustrate the actual tapes 12. In fact, FIGS. 4-8 are indicative of the determination of the paths 50 of the tapes 12, and the paths 50 can be determined before some or all of the tapes 12 are disposed on the mandrel 16. For example, the paths 50 of the tapes 12 can be determined numerically, so that the tapes 12 can then be disposed according to the calculated paths 50.

In order to determine a second path 50b for the second tape 12, indicated individually by reference numeral 12b, that is to be disposed proximate the first tape 12a, a first point (or start point) 54 of the second path 50b is defined at a transverse distance from the path 50a of the first tape 12a. In particular, the first point 54 is typically positioned transversely from the path 50a of the first tape 12a by a distance that is about equal to the width of the tapes 12. Thus, with the first tape 12a disposed along the first path 50a and the second tape 12b disposed along the second path 50b, transverse edges 56 of the tapes 12a, 12b are proximate one another. The centerlines 52a, 52b of the tapes 12a, 12b can be spaced slightly more than the width of the tapes 12 to provide a small gap between the tapes 12. In particular, the first point 54 can be offset transversely slightly more than the width of the tapes 12 so that the tapes 12a, 12b define therebetween an offset distance that is within a predetermined offset distance interval. The predetermined offset distance interval can be defined by a minimum offset distance, a maximum offset distance, and a target (or desired) offset distance that is between the minimum and maximum distances.

Figure 5:
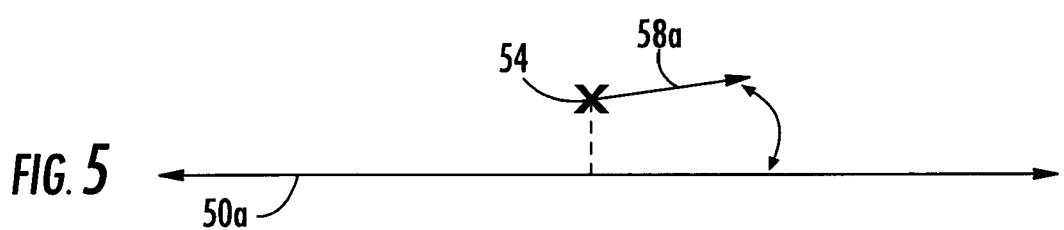
Figure 6:
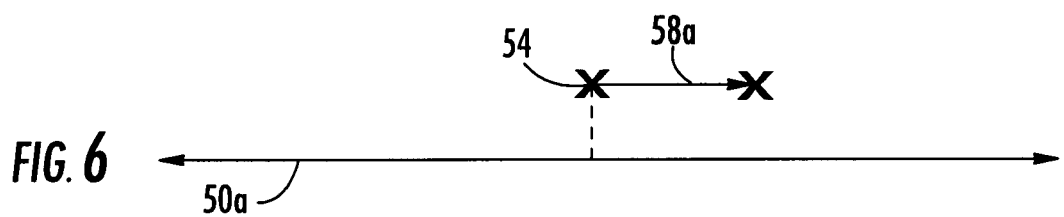
Figure 7:
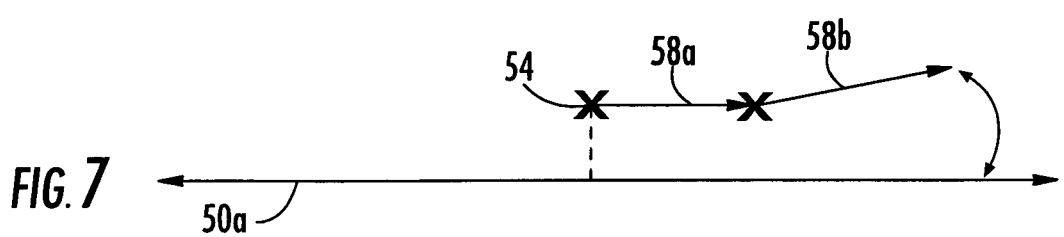
Figure 8:
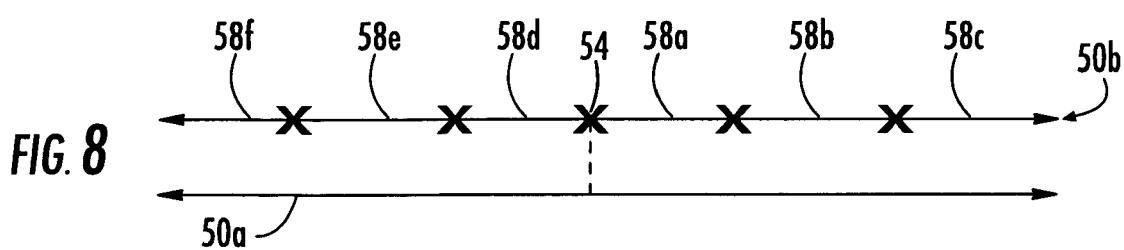

The configuration of the second path 50b in a direction generally toward one of the ends 28, 30 of the surface 18 is then determined in a plurality of natural path segments 58a, 58b, 58c. As shown in FIG. 6, the first segment 58a extends from the first point 54. That is the first end of the first segment 58a is defined by the first point 54, and the opposite, second end of the segment 58a is defined by a subsequent point that is also positioned transversely from the first path 50a by a distance within the predetermined offset distance interval. As shown in FIGS. 7 and 8, the second point of each segment 58a, 58b, 58c is the first point of the successive segment 58a, 58b, 58c along the same path 50. The configuration of each segment 58a, 58b, 58c can be determined using an iterative process, in which the second end of each segment 58a, 58b, 58c is calculated such that each segment 58a, 58b, 58c has a uniform or fixed segment length, and the second end of each segment 58a, 58b, 58c (as defined by the centerline 50b of the segment 58a, 58b, 58c) is maintained within the predetermined offset distance interval from the first path 50a. Further, the first and second tapes 12a, 12b can be made to define a gap along their lengths that is also within the predetermined offset distance interval. For example, the second end of a respective one of the segments 58a, 58b, 58c can first be assigned a coordinate position that is transversely positioned from the first path 50a by the target offset distance, as shown in FIG. 5. The contour of the segment 58a, 58b, 58c (and, hence, the corresponding portion of the tape) is then determined so that the segment 58a, 58b, 58c follows a natural path along the surface 18 between the first and second points. A configuration of a natural path between two points on a contour surface can be determined using various known methods, such as by mathematically modeling the configuration of the tape 12 according to the surface 18. The gap between the first and second tapes 12a, 12b is determined along the entire length of the segment 58a, 58b, 58c. If the gap is outside the interval, i.e., less than the minimum or greater than the maximum offset distances, then the direction of the segment 58a, 58b, 58c is modified slightly (FIG. 6). That is, the segment 58a, 58b, 58c is made to extend from the first point 54 at a slightly different angle. Although the segment extends from the first point at a slightly different angle, the segment 58a, 58b, 58c will still define a natural path between its ends. The orientation of the segment 58a, 58b, 58c is typically modified a minimal amount so that the entire transverse edge 56 of the segment 58a, 58b, 58c defines a gap with the first tape 12a that is within the predetermined offset distance interval.

Thus, after the configuration of the first segment 58a of the second path 50b is determined, the configuration of successive segments 58b, 58c extending from the first segment 58a toward the end 30 of the contour surface 18 are determined similarly in a sequential manner, as shown in FIG. 8. Further, the configuration of the second path 50b is similarly determined in a direction from the first point (start point) 54 toward the opposite end 28 of the contour surface 18, as indicated in FIG. 8, including segments 58d, 58e, 58f. Each path 50 can include any number of segments, and, hence, each tape can define any number of corresponding consecutive portions. Each of the segments, referred to collectively by reference numeral 58, defines a natural path, and the segments 58 are defined such that, with the centerlines 52 of the tapes 12 disposed according to the paths 50, the transverse edges 56 of the first and second tapes 12a, 12b define a gap therebetween that is within the predetermined offset distance interval. The maximum and minimum values of the interval can be determined according to the affect of gaps and laps on the properties of the resulting composite member 14, the requirements of the composite member 14, and the degree of contour of the surface 18. In some cases, the minimum value of the interval can be zero or even a small negative value.

The configuration of all of the paths can be determined before some or all of the tapes 12 are disposed on the contour surface 18. That is, the foregoing method of determining the configuration of the paths 50 can be performed theoretically or numerically, and then the tapes 12 can be disposed accordingly. For example, the configurations of the calculated paths 50 can be stored electronically in a memory 44 of the apparatus 10, and the tapes 12 can then be disposed by the apparatus 10 according to the calculated configurations of the respective paths 50.

According to one method of manufacturing the composite member 14, the contour of the contour surface 18 is modeled and stored numerically in a computer device, e.g., as a plurality of coordinate data values representative of points on the contour surface 18 of the mandrel 16. A programmable logic device, such as a computer operating according to instructions of a computer software program, can be used to calculate the configuration of the paths 50, and the configuration of the paths 50 can be stored for subsequent use in manufacturing the composite member 14. For example, the configurations of the paths 50 can be stored as a plurality of coordinate data points that define the paths 50. The coordinate data points representing the paths 50 can be stored in a database of a computer or in another electronic storage device. Thereafter, the data points, such as stored in the database, can be used to control the motion of the apparatus 10 for disposing the composite tapes 12 to form the composite member 14. For example, the data points can be used to generate instructions characteristic of the motions of the apparatus 10, and those instructions can be stored in the memory 44 or otherwise provided for controlling the apparatus 10 during manufacture of the composite member 14.

As described above, each of the segments 58 of each of the paths 50 defines a natural path extending between the points at the opposite ends of each segment 58; however, the segments 58 of each path 50 in combination do not define a natural path. That is, the segments 58 are joined at non-natural angles. Thus, each tape 12 can be disposed as a plurality of portions, each portion corresponding in length and position to one of the segments 58. Each tape 12 defines the portions continuously. That is, each tape 12 can be continuous and uniform, without breaks or discontinuities between its ends and includes a plurality of the portions between the ends of the tape 12. However, between each pair of adjacent portions, each tape 12 defines the non-natural angle, where the tape 12 diverges slightly from a natural path. Thus, each tape 12 can be slightly stressed at the angles, though typically the tape 12 is not stressed sufficiently to result in wrinkling since the difference in the angle at which adjacent segments (and, hence, tape portions) are disposed is typically relatively small as described below.

The values of the non-natural angles are a result of the determination of the configuration of each segment 58 of each path 50. Each non-natural angle deviates by an angle that is only slightly offset from the angle that would occur in a natural path extending through the same point on the contour surface 18. The amount of offset of each non-natural angle relative to the natural angle that would otherwise be defined by a natural path at the same point on the contour surface 18 can be limited to a maximum offset angle. The maximum offset angle between segments (and, hence, tape portions) can be affected by the contour to which the tape 12 is to conform, the physical properties of the tape 12, the configuration of the apparatus 10, and the like. For example, the maximum offset angle can be affected by the width, thickness, and stiffness of the tape 12; the amount of tack or stickiness of the tape 12 and therefore how well the tape 12 adheres to the underlying layer; the geometric configuration of the compaction device of the apparatus 10; and the like. Typically, the maximum offset angle between adjacent segments 58 (and, hence, tape portions) is less than about 3° or 4° and, more typically, less than about 0.5°. In some cases, the maximum offset angle between adjacent segments (and, hence, tape portions) 58 is less than about 0.1° or even less than 0.001°.

Each tape 12 can define any number of non-natural angles and any number of segments 58 (and, hence, tape portions) therebetween. For example, the number of angles and paths can be determined according to the length of each path of each tape, the complexity of the path of the tape, the maximum desired deviation of the tape from a natural path or from the path of an adjacent tape, and the physical characteristics of the material of the tape. In one typical embodiment of the present invention, each consecutive portion of each tape has a length that is between about 3 inches and 6 feet, such as a length that is between about 6 inches and 3 feet. Thus, in one embodiment, a tape 12 having a length of 18 feet could have between about 3 and 72 consecutive portions (and therefore between about 2 and 71 non-natural angles between the consecutive portions), or between about 6 and 36 consecutive portions (and therefore between about 5 and 35 non-natural angles between the consecutive portions). It is appreciated, however, that the different tapes can define different numbers of portions (and, hence segments 58) and non-natural angles as required for achieving a particular configuration.

As described with reference to FIGS. 4-8, the paths 50 of the tapes 12 are determined from a starting point 54 between the ends 28, 30 of the contour surface 18 and calculated in opposite directions outward from the starting point 54. The starting point 54 can be a midpoint of the respective path 50. In particular, the location of the starting point 54 for each path 50 can be determined according to the midpoint of the previously calculated path 50. Alternatively, the starting point 54 can be positioned other than at the midpoint, e.g., closer to one of the ends 28, 30 of the contour surface 18, or even at one end 28, 30 of the contour surface 18 such that the path 50 can then be determined along a single direction toward the opposite end 28, 30.

In one embodiment, the starting point 54 is positioned proximate a portion of the path 50 where the tape 12 is likely to overlap without modification to the angles between the segments 58 (and, hence, tape portions). That is, before the natural path segments 58 for the second path 50b are determined, a natural path can be determined adjacent the first path 50a. Typically, the natural path is not precisely parallel to the first path 50a. Thus, a transverse distance between the two paths 50a, 50b varies along the length of the paths 50a, 50b. That is, at one or more portions of the paths 50a, 50b, the two paths 50a, 50b define a minimum transverse distance. The start point 54 for calculating the configuration of the second path 50b can be positioned at a point corresponding in position on the contour surface 18 to the portion of the natural path where the minimum transverse distance is defined. In other words, the starting point 54 for calculating the path of the second path 50b can correspond to the portion of the surface where overlap between the tapes 50a, 50b would most likely occur if the second tape 12b were disposed along a natural path. It is believed that the use of such a starting point can result in minimal laps and gaps without using excessive offset angles between successive segments 58 of each path 50. In any case, the tapes 12 can be disposed continuously from one end 28, 30 of the contour surface 18 to the other end 28, 30 by the apparatus 10, which traverses repeatedly between the two ends 28, 30, laying one or more of the tapes 12 in each pass.

Figure 9:
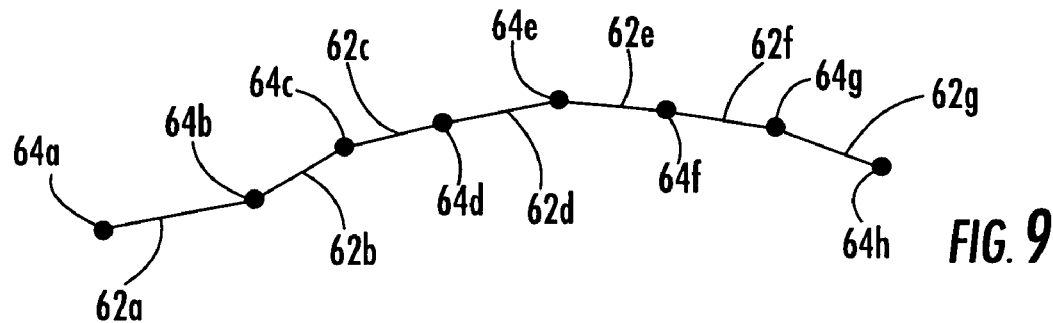
FIGS. 9-11 are plan views schematically illustrating the paths along which elongate tapes are disposed for forming a composite member according to another embodiment of the present invention.
Figure 10:
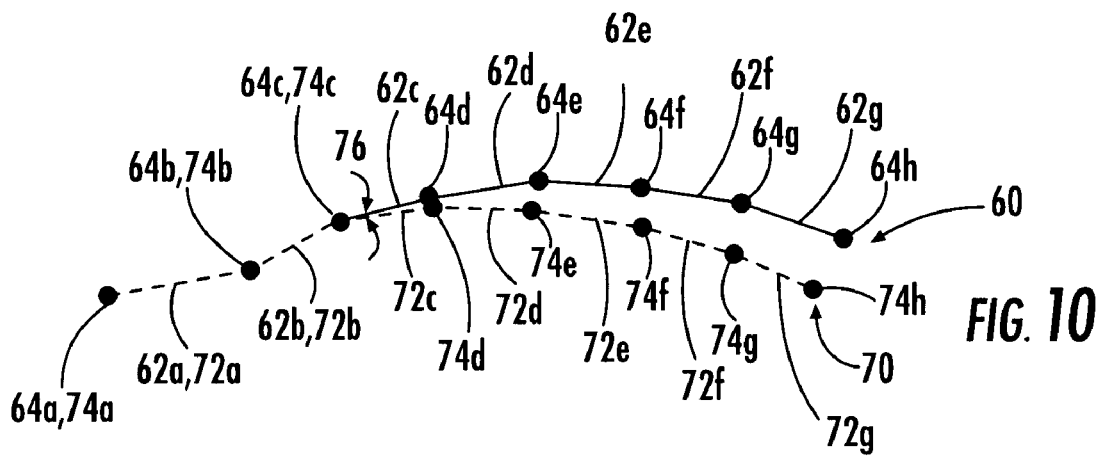
Figure 11:
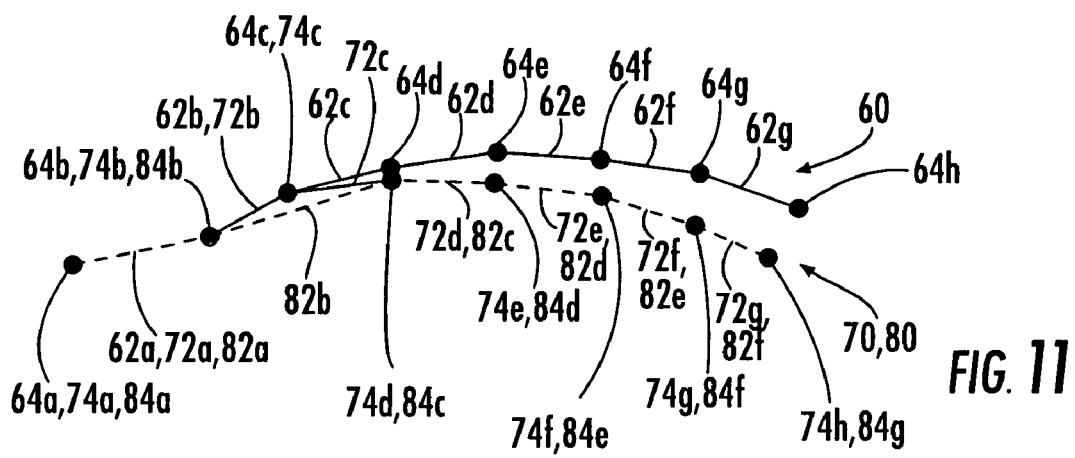

FIGS. 9-11 illustrate the effect of the adjustment of the non-natural angles between the segments 58 of the paths 50 of the tapes 12. In particular, FIG. 9 illustrates a natural or geodesic path over a contour surface 18. FIG. 10 illustrates a comparison between the natural path of FIG. 9 and a modified path 50 determined according to the present invention, i.e., a path formed of a plurality of natural path segments 58, with at least some of the adjacent segments 58 defining non-natural angles. In particular, the natural path 60 of FIG. 9 includes seven segments 62a-62g that are defined by eight points 64a-64h. At the six points 64b-64g between adjacent segments 62a-62g of the path 60, the path 60 defines natural angles. Similarly, a modified path 70 according to the present invention having seven segments 72a-72g is shown in FIG. 10, with points 74a-74h. However, the angle between the second and third segments 72b and 72c is a non-natural angle. That is, the angle is modified from the natural angle by an offset angle 76, and therefore the path of the segments 72b, 72c is modified from the natural path. In fact, it is shown that a relatively small modification in the angles can significantly affect the configuration of the path 70. Thus, the gaps and/or laps between adjacent tapes 12 can be minimized, eliminated, or otherwise optimized. In this regard, it is noted that the offset angle 76 indicated in FIG. 10 is shown to be somewhat larger than typically employed for purposes of illustration.

Figure 12:
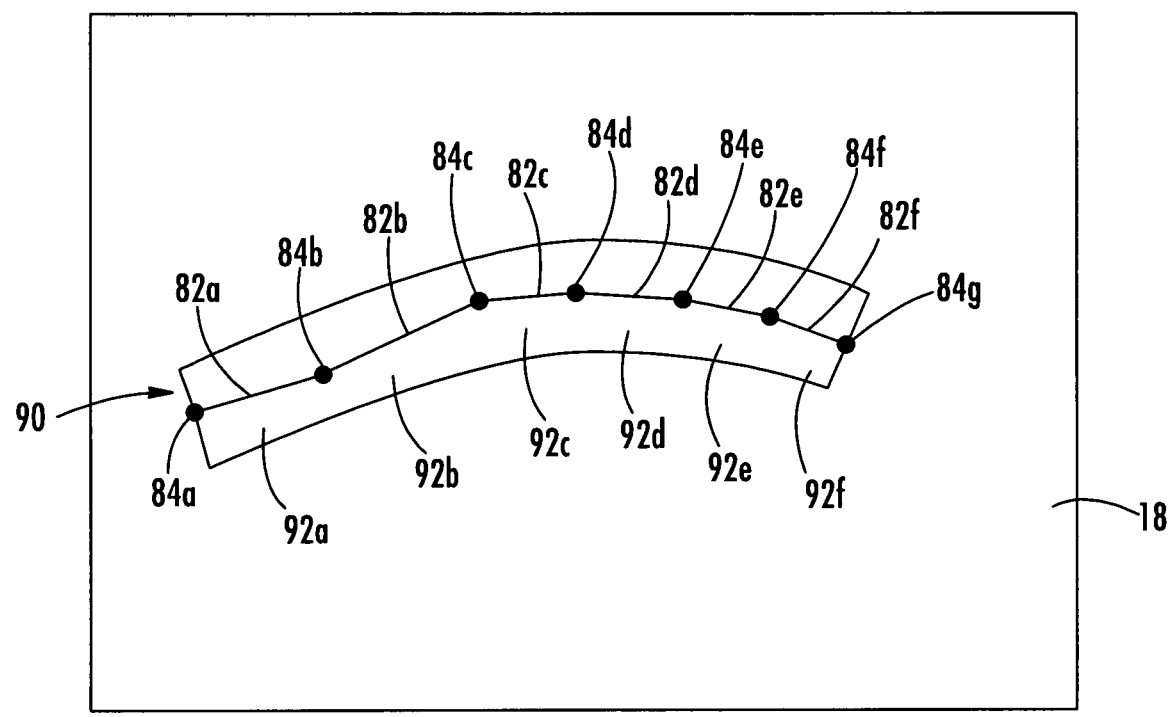
FIG. 12 illustrates a composite tape disposed along the path of FIG. 11.

FIG. 11 illustrates a further modification to the path of FIG. 10. The modified path 80 of FIG. 11 includes six segments 82a-82f defined by seven points 84a-84g. In particular, the modified path 80 omits the third point 74c of the path 70 shown in FIG. 10, i.e., the first point of deviation of the path 70 shown in FIG. 10 from the natural path 60 of FIG. 9. While not intending to be limited to any particular theory, it is believed that the omission one or more of the points where the modified path first deviates from the natural path can improve the smoothness of the modified path, thereby possibly reducing stresses in the tape 12, wrinkling, and/or lapping or gapping between tapes 12. FIG. 12 illustrates a tape 90 disposed on a contour surface 18, the tape 90 defining portions 92a-92f, each of which corresponds to the path segments 82a-82f of the path 80 of FIG. 11.

The segments 58, 72a-72g, 82a-82f of the paths 50, 70, 80, and hence the portions of the tapes 12, can have various lengths. In one embodiment of the present invention, each of the segments 58 is at least about as long as the distance between the supply roll 20 of the tape 12 and the roller 24 or other compaction device, i.e., such that any tape 12 that has been dispensed from the roll 20 within the apparatus 10 can be disposed onto the mandrel 16 before the direction of each tape 12 is modified at a subsequent non-natural angle defined by the respective path. Alternatively, if the tape 12 is supported between the roll 20 and the compaction device, such as by the roller 32 or other support structure, each segment (and, hence, each corresponding portion of the tape 12) can have a length that is at least about the distance between the compaction device and the roll 20 or other support structure. For example, in one embodiment, each segment has a length that is at least about 30 inches.

Each tape 12 typically has a uniform width along its length, i.e., so that the transverse edges 56 of each tape are linear and parallel to one another. However, in some cases, one or both of the edges 56 can be nonlinear and/or the edges can be nonparallel. For example, one of the edges 56 of each tape 12 can be trimmed before or during the lay-up operation. In this way, the tapes 12 can be adapted to further accommodate various contours in the workpiece and/or reduce lapping or gapping between tapes 12. An apparatus and method for slitting or cutting tapes 12 is further describes in U.S. Pat. No. 11/088,288, titled "Apparatus and Method for Composite Tape Profile Cutting," filed Mar. 24, 2005, the entirety of which is incorporated herein by reference.

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A method of forming a composite member, the method comprising:
providing a contour surface corresponding in shape to a desired contour of the composite member for supporting a plurality of elongate tapes in a substantially parallel configuration, each tape including a plurality of reinforcement members disposed in a matrix material; and
disposing each of the elongate tapes along a path defined by a plurality of natural path segments, each segment of a single path being disposed at a non-natural angle relative to adjacent segments of the path, and each tape comprising a plurality of physically discrete portions corresponding to the natural path segments and positioned relative to adjacent portions in a continuous, end-to-end manner in a lengthwise direction so as to define the non-natural angle between adjacent portions without discontinuities between consecutive portions, such that a transverse edge of each elongate tape is disposed within a predetermined offset distance interval from an adjacent one of the tapes.

2. A method according to claim 1, further comprising determining a configuration of each path by:
determining the contour of the surface;
determining a first path across at least a portion of the surface; and
calculating a configuration of each natural path segment of a second path adjacent the first path, a first end of each natural path segment of the second path defining an offset angle relative to an adjacent natural path segment of the second path such that a second end of each natural path segment of the second path defines an offset distance from the first path, the offset distance being within the predetermined offset distance interval.

3. A method according to claim 2 wherein said calculating step comprises calculating the natural path segments with the offset angle of each natural path segment being less than a maximum offset angle such that the elongate tapes are configured to be disposed without wrinkling.

4. A method according to claim 2 wherein said calculating step comprises calculating the natural path segments with the offset distance of the second end of each natural path segment being approximately equal to a target distance that is less than the predetermined offset distance interval.

5. A method according to claim 2 wherein said calculating step comprises:
calculating the configuration of a first one of the natural path segments of the second path at a point partially between opposite ends of the second path; and
calculating the configuration of the successive natural path segments of the second path in opposite directions from the first one of the natural path segments, the second end of each successive path segment defining the first end of a successive one of the path segments.

6. A method according to claim 5 further comprising:

prior to said step of calculating the configuration of the first one of the natural path segments, determining a configuration of a natural path adjacent the first path; and determining a portion of the natural path adjacent the first path defining a minimum transverse distance therebetween, wherein said step of calculating the configuration of the first one of the natural path segments comprises calculating the configuration of the first one of the natural path segments at a point corresponding in position to the portion of the natural path defining the minimum transverse distance.

7. A method according to claim 1 wherein said disposing step comprises disposing the elongate tapes from a supply roll of an automated tape laying device and pressing the tape against the contour surface with a compaction device.

8. A method according to claim 7 wherein said disposing step comprises disposing each tape in the plurality of portions, each portion of each tape being at least about a length of the tape supported between the supply roll and the compaction device of the automated tape laying device.

9. A method according to claim 1 wherein said disposing step comprises disposing the tapes on the surface substantially without wrinkling of the tapes.

10. A method according to claim 1 wherein said disposing step comprises disposing each elongate tape with adjacent portions of the tapes defining an offset angle that is less than about 4°.

11. A method according to claim 1 wherein said disposing step comprises disposing each elongate tape with adjacent portions defining an offset angle that is less than about 0.5°.

12. A method according to claim 1 wherein said disposing step comprises disposing each elongate tape such that each of the consecutive portions defines a length between about 3 inches and 6 feet, adjacent portions of each tape defining the non-natural offset angles therebetween.

13. A method according to claim 1 wherein said disposing step comprises disposing each elongate tape such that each of the consecutive portions defines a length between about 6 inches and 3 feet, adjacent portions of each tape defining the non-natural offset angles therebetween.

* * * * *